US009969519B2

(12) United States Patent
Putzer et al.

(10) Patent No.: US 9,969,519 B2
(45) Date of Patent: May 15, 2018

(54) DEVICE AND METHOD FOR DETECTING THE ACTUAL POSITION OF AT LEAST ONE LABEL TRANSFER ELEMENT OF A LABELING MACHINE

(75) Inventors: Frank Putzer, Hamburg (DE); Holger Stenner, Haltern am See (DE)

(73) Assignee: KHS GmbH, Dortmund (DE)

( * ) Notice: Subject to any disclaimer, the term of this patent is extended or adjusted under 35 U.S.C. 154(b) by 543 days.

(21) Appl. No.: 13/321,616

(22) PCT Filed: Jul. 20, 2010

(86) PCT No.: PCT/EP2010/004412

§ 371 (c)(1), (2), (4) Date: Nov. 21, 2011

(87) PCT Pub. No.: WO2011/023268

PCT Pub. Date: Mar. 3, 2011

(65) Prior Publication Data

US 2012/0061000 A1 Mar. 15, 2012

(30) Foreign Application Priority Data

Aug. 31, 2009 (DE) ........................ 10 2009 038 810

(51) Int. Cl.
*B32B 41/00* (2006.01)
*B65C 9/40* (2006.01)

(52) U.S. Cl.
CPC ...................................... *B65C 9/40* (2013.01)

(58) Field of Classification Search
CPC .. B65C 3/14; B65C 9/045; B65C 9/40; G01N 2021/8841; G11B 21/02; G11B 21/21; G11B 5/6005

(Continued)

(56) References Cited

U.S. PATENT DOCUMENTS 6,246,390 B1 6/2001 Rosenberg
6,459,092 B2 10/2002 Cho et al.
(Continued)

FOREIGN PATENT DOCUMENTS

DE 8703016 8/1987
DE 102004005994 9/2005
(Continued)

*Primary Examiner* — Michael N Orlando
*Assistant Examiner* — Joshel Rivera
(74) *Attorney, Agent, or Firm* — Occhiuti & Rohlicek LLP

(57) ABSTRACT

The invention relates to a device and an associated method for detecting the actual position (P) of at least one label transfer element (2) of a labeling machine relative to the peripheral surface (3') of a container (3) to be labeled, such as bottles, cans, cardboard boxes, and the like, comprising at least one sensor unit (5, 6) and at least one control and evaluation unit (7) operatively connected to the at least one sensor unit, wherein the at least one container (3) to be labeled is arranged so as to be rotatable about a rotational axis (DA) in a movement and transport plane (E). Especially advantageously, a three-dimensional detection space is associated with the at least one label transfer element (2) and the particular container (3) to be labeled, a coordinate sys tem having three coordinate axes (x, y, z) spanning said three-dimensional detection space, and the at least one sensor unit (5, 6) being designed to contactlessly detect the actual position (P) of the label transfer element (2) relative to the peripheral surface (3') of the container (3) in the three-dimensional detection space.

21 Claims, 2 Drawing Sheets

(58) Field of Classification Search
USPC ......... 156/64, 350, 351, 360, 362, 367, 378, 156/379
See application file for complete search history.

(56) References Cited

U.S. PATENT DOCUMENTS

| | | | | |
|---|---|---|---|---|
| 2006/0113020 | A1* | 6/2006 | Giacomazzi et al. | 156/64 |
| 2009/0173450 | A1 | 7/2009 | Thatenhorst | |

FOREIGN PATENT DOCUMENTS

| | | |
|---|---|---|
| DE | 19758799 | 3/2008 |
| WO | 97/42086 | 11/1997 |

* cited by examiner

DEVICE AND METHOD FOR DETECTING THE ACTUAL POSITION OF AT LEAST ONE LABEL TRANSFER ELEMENT OF A LABELING MACHINE

CROSS REFERENCE TO RELATED APPLICATIONS

This application claims the benefit of the priority date of international application no. PCT/EP2010/004412, filed Jul. 20, 2010, which claims the benefit of the priority date of German application no. 10 2009 038 810.9, filed Aug. 31, 2009. Both applications are incorporated herein by reference.

FIELD OF INVENTION

The invention relates to an apparatus and method for detecting an actual position of a label-transfer element of a labeling machine relative to a peripheral surface of a container to be labeled.

BACKGROUND

Labeling machines, in particular rotary labeling machines, are sufficiently well known from the prior art. In this case, the entire labeling station of the labeling machine, i.e. the carrier with the gripper cylinder and also the label magazine and the gluing roller, is formed for example as a unit that can rotate about the carrier axis. Due to the rotation-related shift in the rotational path of the gripping and pressing elements in the direction of the transport path of the objects, in particular of the containers to be labeled, such as bottles, cans, cardboard boxes and the like, the different distances of the regions to be labeled, brought about by the different object formats, can be covered by the labeling station.

For example, there is known from DE 10 2004 005 994 A1 such a labeling machine for applying labels to peripheral surfaces of containers such as bottles, cans, cardboard boxes, etc., that comprises a movement and transport plane for the containers, an associated handover region for applying the labels to the containers, and a labeling station with label transfer and label supply devices. A label-transfer element carries out the label transfer. A typical label-transfer element has moving devices in the form of a plurality of servo motors or motor-driven length-adjustable moving arms that are mounted in a multidimensionally movable and adaptable manner in a working space with unrestricted actuation of a pivot point that can be selected without restriction for label transfer.

In order to achieve a good labeling result, namely a label applied in a bubble-free and/or fold-free manner, the orientation of the label-transfer element relative to the container to be labeled is of primary importance. In particular, it is necessary that an optimal spatial orientation of the label-transfer element relative to the container to be labeled is achieved so that, for example, the dispensing edge of the label-transfer element is oriented almost completely parallel to the peripheral surface to be labeled on the object.

In the event of a change in the labeling task, for example in the event of a change in format, a readjustment of the label-transfer element relative to the container to be labeled is required, wherein already existing, tried and optimized settings for a given format are usually no longer reproducible. Reasons for the lack of reproduction accuracy include the play in the mechanical components and the lack of precision of the position counters available on the market for the required movement motors, particularly the lack of precision of spindle motors.

Another problem arises in the case of labeling machines of modular construction, in which the labeling units for the different labeling techniques, e.g. self-adhesive technique, cold gluing technique, hot gluing technique or labels applied from a roll, etc. are swapped with one another. Particularly when removing and re-attaching such a labeling module, relatively large deviations occur in the achieved orientation or positioning. Such a deviating orientation of the labeling module as a whole has a direct effect on the orientation of the label-transfer element. This means that the label-transfer element itself, even if the optimized setting is correctly taken over, is in principle incorrectly oriented relative to the peripheral surface of the container to be labeled if the labeling module as such is not correctly inserted. As a particularly important feature of the prior art, this means that the display elements known from the prior art, particularly position displays, display only the orientation of the label-transfer element relative to the labeling module.

SUMMARY

Proceeding therefrom, the object of the invention is to provide a device and an associated method for detecting the actual position of a label-transfer element, in particular relative to a target position, that allows a reproducibility of optimal position settings that have already been found.

The main aspect of the device according to the invention can be seen in that a label-transfer element and the respective container to be labeled are assigned a three-dimensional detection space that is spanned by a coordinate system having three coordinate axes, and in that a sensor unit is designed to detect, preferably in a contactless manner, the actual position of the label-transfer element relative to the peripheral surface of the container in the three-dimensional detection space. Because the sensor units have detected the actual position of the label-transfer element, it is possible, with particular advantage, to use mechanical components, in particular inclining and pivoting devices, of low precision. The settings of the movement mechanics can be stored electronically and reused as presets. A constant monitoring of the set values is also possible, thereby avoiding operating errors. A particular advantage, however, a quick and accurate reproducibility of settings that have already been found is now possible.

The main aspect of the method according to the invention can be seen in that the label-transfer element and the container to be labeled are assigned a common three-dimensional detection space that is spanned by a coordinate system having three coordinate axes, and in that the actual position of the label-transfer element relative to the peripheral surface of the container in the common three-dimensional detection space is detected, preferably in a contactless manner, by a sensor unit and a control-and-evaluation unit operatively connected thereto.

Advantageously, the actual position is defined by position coordinates of the three-dimensional detection space that comprise the pivot angle and/or the inclination angle of an orthogonal axis of the label-transfer element relative to one of the coordinate axes of the three-dimensional detection space. The coordinate system may be formed for example by a Cartesian coordinate system having an x, y and z axis, wherein the position coordinates comprise the x, y and/or z coordinate of the actual position. In this case, for example, at least one of the three coordinate axes of the three-dimensional detection space runs parallel to the axis of rotation of the container to be labeled.

With particular advantage, the sensor unit is arranged at a distance from the label-transfer element or is directly connected to the latter. To this end, the sensor unit may be formed by an electro-optical sensor unit, an electronic inclination sensor, an electronic ruler and/or an end position/zero position sensor. The electro-optical sensor unit may be embodied for example in the form of a camera system with downstream electronic image processing or in the form of a laser system for measuring/position determination.

The label-transfer element is formed by a dispensing edge, a gripper cylinder with a control system or a vacuum drum. A rotary plate apparatus is preferably provided in order to arrange the container to be labeled in such a way as to be able to rotate about the axis of rotation or container longitudinal axis.

Furthermore, the label-transfer element is advantageously mounted to be either rotatable, pivotable, or linearly displaceable manner in the three-dimensional detection space via mechanical and/or electromechanical movement means. The label-transfer element may also be assigned at least one position-detection element that can be detected in a contactless manner by the sensor unit. The position-detection element is formed by, for example, a colored body having a pronounced body edge or a reference pattern surface.

Further developments, advantages and possible uses of the invention will become apparent from the following description of examples of embodiments and from the figures. All the features described and/or shown form in principle, per se or in any combination, the subject matter of the invention, regardless of the way in which they are combined in the claims or the way in which they refer back to one another. The content of the claims is also included as part of the description.

BRIEF DESCRIPTION OF THE FIGURES

The invention will be explained in more detail below with reference to the figures and on the basis of an exemplary embodiment. In the figures.

DETAILED DESCRIPTION

Figure 1:
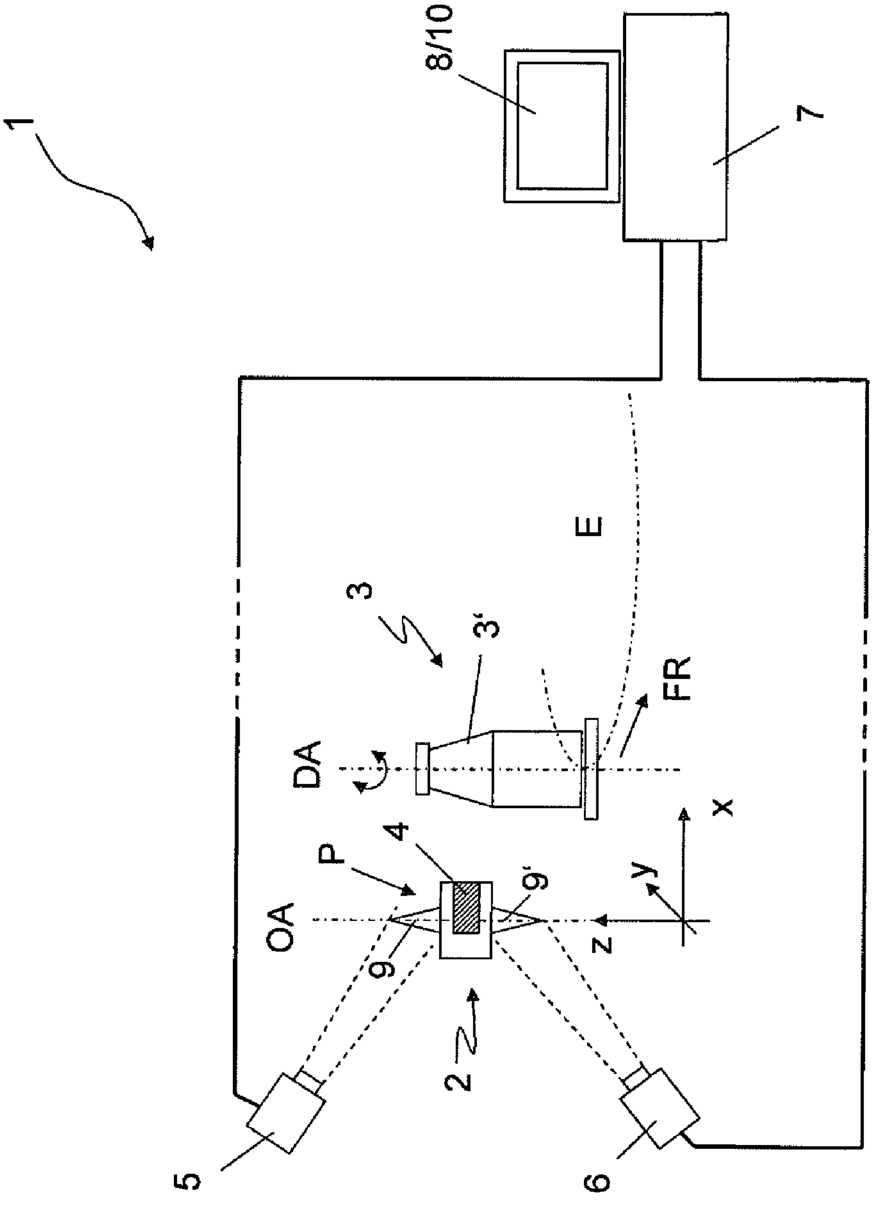
FIG. 1 shows a schematic functional view of a device according to the invention for detecting the actual position of a label-transfer element.

Shown by way of example in FIG. 1 is a schematic functional view of the device 1 according to the invention for detecting the actual position P of a label-transfer element 2 of a labeling machine relative to a target position, namely the peripheral surface 3' of a container 3 to be labeled.

Containers 3 in the context of the invention are any packaging means that can be labeled, in particular containers, cans, bottles, but also other packaging means that are preferably, but not necessarily, configured at least on one sub-region of their outer or peripheral surface 3' in a rotationally symmetrical manner relative to their container longitudinal axis.

The structure of a labeling machine is sufficiently well known from the prior art, namely, for example, from DE 10 2004 005 994 A1. Through the use of such labeling machines, containers 3 are mechanically provided with a label 4 on their peripheral surface 3', the label preferably being glued onto the peripheral surface 3'.

As used herein, a label-transfer element 2 is understood to mean a mechanical component that transfers the label 4 to the container 3 to be labeled in a manner precisely positioned at the labeling site provided for this purpose. By way of example, the label-transfer element 2 may be formed by a dispensing edge in a process called "self-adhesive labeling," or by a gripper cylinder with a control system in a process called "cold-glue labeling," or by a vacuum drum in a process called "hot-glue labeling."

As already mentioned above, in order to ensure that the label 4 is applied in a bubble-free and/or fold-free manner to the peripheral surface 3' of the container 3, the orientation of the label-transfer element 2 relative to the peripheral surface 3' of the container 3 to be labeled and of the peripheral surface 3' thereof is of primary importance. In particular, it is necessary that an optimal spatial orientation of the label-transfer element 2 relative to the peripheral surface 3' of the object to be labeled be achieved so that, for example, the label-transfer element 2 formed by a dispensing edge is oriented almost completely parallel to the peripheral surface 3' to be labeled and preferably at right angles to a conveying direction FR of the container 3 in a movement and transport plane E.

The labeling machine considered below is designed, for example, for transferring individual labels 4 to containers 3 such as bottles, cans and the like. However, the invention is in no way limited to such an embodiment, but can be used also on differently configured labeling machines.

The device 1 according to the invention furthermore comprises a sensor unit 5, 6 and a control-and-evaluation unit 7 operatively connected thereto. In the present example of embodiment shown in FIG. 1, a first and a second sensor unit 5, 6 are provided, each of which is connected to the control-and-evaluation unit 7. Also connected to the control-and-evaluation unit 7 is a display unit 8 or an operating console 10 that, in either case, has a display area. The control-and-evaluation unit 7 and/or the display unit 8 may in this case be part of the labeling machine or may be provided in a manner spatially separate therefrom.

The container 3 to be labeled is in each case arranged in a movement and transport plane E in such a way as to be able to rotate about an axis of rotation DA, preferably through the use of a rotary plate apparatus. Preferably, the axis of rotation DA is coincident with the container longitudinal axis, which runs approximately perpendicular to the movement and transport plane E. In the following exemplary embodiment, the container 3 is configured in a rotationally symmetrical manner in relation to the container longitudinal axis.

In order to determine the rotary position of the rotary plate apparatus holding the container 4, the rotary plate apparatus is connected to the control-and-evaluation unit 7 with the drive of the rotary plate apparatus about the axis of rotation DA preferably being controlled by the control-and-evaluation unit 7.

According to the invention, the label-transfer element 2 and the respective container 3 to be labeled are arranged in a three-dimensional detection space that is spanned by a coordinate system having three coordinate axes x, y, and z. The term "three-dimensional detection space" is understood to mean a three-dimensional space that surrounds the label-transfer element 2 and the container 2 to be presently labeled, i.e. that forms a three-dimensional detection space common to both.

The coordinate system is provided for identifying different positions in the three-dimensional detection space from which translations in the three-dimensional detection space can be unambiguously defined. In the present exemplary embodiment, the coordinate system is formed by a Cartesian coordinate system having an x axis, a y axis and a z axis, each of which run perpendicular to one another.

The label-transfer element 2 is mounted in a rotatable and/or pivotable and/or linearly displaceable manner in the three-dimensional detection space via mechanical and/or electromechanical movement means (not shown in the figures) that can be actuated either automatically or manually. These may be formed for example by linear drives, lifting gear or spindle drives.

By way of example, the label-transfer element 2 is movable through a pivot angle α about an orthogonal axis OA, which defines the parallel attachment of the label 4 relative to the peripheral surface 3' of the container 3. Also provided is a mobility of the label-transfer element 2 through an inclination angle β, once again relative to the orthogonal axis OA, which defines the parallel orientation of the label transfer point of the label-transfer element 2 relative to the peripheral surface 3' of the container 3. A correct setting of the inclination angle β is necessary in particular for fold-free and/or bubble-free labeling. Finally, the label-transfer element 2 is designed to be linearly displaceable at least along two coordinate axes x, y of the Cartesian coordinate system, namely preferably along the x and y axes.

Taking account of the aforementioned movement possibilities, the actual position of the label-transfer element 2 can be unambiguously detected by means of position coordinates in the common three-dimensional detection space, wherein the position coordinates are defined for example by the pivot angle α, the inclination angle β and the x, y and/or z coordinates of the Cartesian coordinate system.

The term actual position of the label-transfer element 2 is thus understood to mean the orientation and arrangement of the label-transfer element 2 in the three-dimensional detection space, namely for example relative to a reference point. The reference point may be defined for example by the peripheral surface 3' to be labeled on the label transfer point.

It should be noted that, when determining the actual position P in the three-dimensional detection space, depending on requirements, at least one of the three degrees of freedom in translation and at least one of the three degrees of freedom in rotation of the label-transfer element 2 in the three-dimensional detection space are to be detected.

In this case, the following coordinates can be detected individually or in any combination, namely the x, y, z coordinates of a point of the label-transfer element 2 in the three-dimensional detection space ("degrees of freedom in translation") and/or the x, y, z coordinates of at least two points of the label-transfer element 2 in the three-dimensional detection space and/or the orientation of at least one of the main axes of the label-transfer element 2 in the three-dimensional detection space ("degrees of freedom in rotation").

With particular advantage, the sensor unit 5, 6 is designed to detect in a contactless manner the present position of the label-transfer element 2 relative to the peripheral surface 3' of the container 3 based on the position coordinates in the three-dimensional detection space, wherein preferably the sensor unit 5, 6 is assigned to one label-transfer element 2.

By way of example, the sensor unit 5, 6 is provided in the form of an electro-optical sensor unit that is formed for example by a camera system with downstream electronic image processing and/or by a laser system for measuring/position determination. For the absolute detection of the actual position P of the label-transfer element 2, there may be provided for example a laser pointer that is fixedly connected to the labeling machine and that is aimed at a target arranged on the label-transfer element 2. The evaluation of the laser light spot on the target may take place for example via a camera system, preferably a smart camera.

In an alternative embodiment, the label-transfer element 2 as such is detected by means of the sensor unit 2. To this end, the label-transfer element 2 is assigned a position-detection element 9 that can be detected in a contactless manner by the sensor unit 5, 6. The position-detection element 9 is preferably directly connected to the label-transfer element 2.

An example of a position-detection element 9 is an element that can be detected particularly easily and that can be applied to the label-transfer element 2, for example a (colored) body having a pronounced body edge. In the example of embodiment shown in FIG. 1, two position-detection elements 9, 9' are provided, each of which is formed by a pyramid-shaped body, the body edges of which can be detected in a contactless manner by respectively the first and second sensor unit 5, 6.

Alternatively, the position-detection element 9 may be formed by a reference pattern surface that is located on the outer surface of the label-transfer element 2. The reference pattern surface comprises for example a symmetrical arrangement of lines that allow unambiguous detection by means of the sensor unit 5, 6, for example a smart camera.

The sensor unit 5, 6 may also be arranged directly on the label-transfer element 2, namely preferably at an invariable distance from the label transfer point or the dispensing edge. The sensor unit 5, 6 is designed for the absolute or relative detection of the actual position P of the label-transfer element 2 in the three-dimensional detection space, wherein, in the case of a relative detection, the peripheral surface 3' of the container 3 can serve as the reference point. For the absolute detection of the actual position P, linear scales are particularly preferably used.

Such a sensor unit 5, 6 may be embodied for example in the form of a single-axis or double-axis electronic inclination sensor 5', 6', via which it is possible to detect a pivoting and inclining of the label-transfer element 2 or of the label transfer point relative to the orthogonal axis thereof, preferably the longitudinal axis thereof. Via said sensor units 5', 6', it is thus possible to detect the pivot angle α and the inclination angle β in the form of electronic position signals that can be evaluated in order to determine the actual position P.

As an alternative or in addition, the sensor unit 5, 6 may be embodied in the form of an end-position sensor or zero-position sensor, in which case, in order to detect the actual position P, the label-transfer element 2 is moved in a predefined direction until the label-transfer element 2 triggers the end-position or zero-position sensor. This results in detection of at least one coordinate of the actual position P of the label-transfer element 2.

If the detection of the actual position P of the label-transfer element 2 takes place, for example, according to the principle of pattern recognition on a reference surface, sensor unit 5 detects the position-detection element 9, which in one example is in the form of a symmetrical arrangement of lines. The sensor unit 5 in this case is designed in the form of a smart camera with a special evaluation routine. The actual position P is then calculated therefrom.

The reference pattern surface in the above example is part of the label-transfer element 2. For each label-transfer element 2, an intelligent sensor is provided in the labeling machine. Using a software routine, the control-and-evaluation unit 7 compares the detected reference pattern with a stored pattern and determines the x, y, z coordinates and the pivot and inclination angles α, β.

In the event of a change in format, an operating console or a man/machine interface 10 of the labeling machine displays the target position S required for the selected format together with the actual position P based on the position coordinates, inclination and pivot angles α, β, as well as the x, y, z coordinates. The operator can then perform a manual adjustment of the label-transfer element 2. The change in the actual position P is in this case displayed directly on the operating console 10. When the actual position P and the displayed target position S coincide, the labeling machine declares itself ready for operation. With particular advantage, existing positions for a predefined format that have proven to be advantageous can be used again. To this end, these are stored in a memory unit of the control-and-evaluation unit 7.

Figure 2:
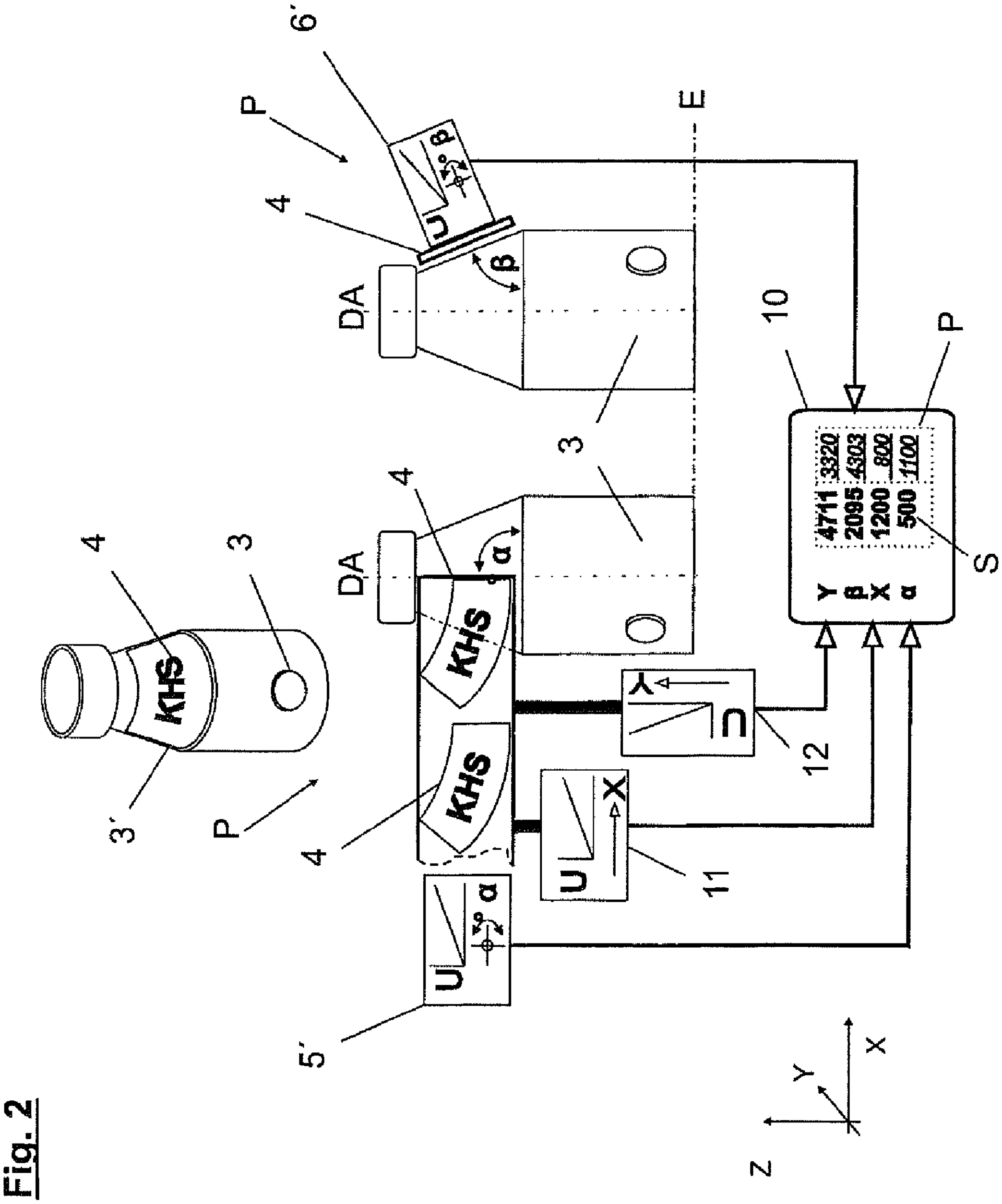
FIG. 2 shows a schematic block diagram of an alternative embodiment of the sensor units provided for detecting the actual position in a contactless manner, in different views.

In a second exemplary embodiment, shown in FIG. 2, self-adhesive labels 4 are applied to the conical part of a container, for example to the conical part of a bottle 3. The front edge of the label 4, arranged at an angle, is first made to stick onto the bottle 3. Then, by superposing a rotation of the container about its axis of rotation DA, the movement of the container-carrying rotor of the labeling machine and the constant dispensing movement is transferred fully to the container.

Once the label 4 has been fully transferred, the label 4 is fully attached to the bottle 3 by suitable pressing elements, for example brushes.

In order to illustrate this, FIG. 2 shows a schematic side view of the container 3 and of the respectively associated label-transfer element 2 in different views.

In the case of self-adhesive labels 4, the label-transfer element 2 is formed by a dispensing edge, the actual position P of which, in the three-dimensional detection space, is detected by means of a first and second sensor unit 5', 6'. In particular, the first sensor unit 5' detects the pivot angle α and the second sensor unit 6' detects the inclination angle β.

In FIG. 2, the pivot angle α defines the parallel attachment of the label 4 to the cylindrical main body of the bottle 3, and the inclination angle β defines the parallel orientation of the dispensing edge relative to the bottle surface to be labeled. The x and y coordinates are detected by third and fourth sensor units 11, 12. In this case, the detection takes place in the form of a variable electrical signal as a function of the respective measurement parameter. Such a signal can be an analog or digital signal, a signal carried on a data bus, or a signal that carries binary information.

The invention has been described above on the basis of certain exemplary embodiments. It will be understood that numerous changes and modifications are possible without thereby departing from the inventive concept on which the invention is based.

In addition to the electronic detection of pivot and inclination angles α, β, a monitoring of the distance to the dispensing edge from the container 3 and of the height position of the label 4 on the container 4 by using electronic rulers is also possible.

In addition, movement means that can be driven by motors may be provided, these being moved in a controlled manner from the actual position P to the predefined target position S via the control-and-evaluation unit 7 in each case.

The described sensor units 5, 5', 6, 6', 11, 12 each have very different detection accuracies; specifically, inclination sensors have an accuracy of ±0.5 degrees, linear scales have an accuracy of ±5 μm and camera systems including the associated image processing have an accuracy of ±1 pixel of the optical sensor, which, given a suitable design of the associated components, leads to an accuracy of approximately ±0.2 mm. According to the invention, the most accurate sensor units 5, 5', 6, 6', 11, 12 are provided for each detection task, as a result of which the required accuracy can be achieved when determining the actual position P of the label-transfer element 2.

LIST OF REFERENCES

1 device
2 label-transfer element
3 container
3' peripheral surface
4 label
5 first sensor unit
5' first sensor unit
6 second sensor unit
6' second sensor unit
7 control-and-evaluation unit
8 display unit
9 position-detection element
9' position-detection element
10 operating console
11 third sensor unit
12 fourth sensor unit
DA axis of rotation
OA orthogonal axis
x x coordinate
y y coordinate
z z coordinate
α pivot angle
β inclination angle
E movement and transport plane
FR conveying direction
P actual position
S target position

The invention claimed is:

1. An apparatus comprising a bottle-labeling machine for applying a label to a peripheral surface of a container that is arranged for movement in a transport plane and about an axis of rotation, wherein said bottle labeling machine comprises a labeling machine, wherein said labeling machine comprises a label-transfer element, a sensor system, a position-detection element, and a control-and-evaluation unit, wherein said sensor system comprises a sensor unit, wherein said sensor unit is directed toward said label-transfer element, wherein said sensor unit is directed toward said position-detection element, wherein said position-detection element is detectable by said sensor unit, wherein said position-detection element is disposed on said label-transfer element, wherein said control-and-evaluation unit is operatively connected to said sensor unit, and wherein said control-and-evaluation unit is configured to detect, based on a detected position of said position-detection element, an actual position of said label-transfer element relative to said peripheral surface of said container in a three-dimensional detection space, wherein said sensor unit comprises an electronic ruler that is configured to detect a position of a label on a container.

2. An apparatus comprising a bottle-labeling machine for applying a label to a peripheral surface of a container that is arranged for movement in a transport plane and about an axis of rotation wherein said bottle labeling machine comprises a labeling machine, wherein said labeling machine comprises a label-transfer element, a sensor system, a position-detection element, and a control-and-evaluation unit, wherein said sensor system comprises a sensor unit, wherein said sensor unit is directed toward said label-transfer element, wherein said sensor unit is directed toward said position-detection element, wherein said position-detection element is detectable by said sensor unit, wherein said position-detection element is disposed on said label-transfer element, wherein said control-and-evaluation unit is operatively connected to said sensor unit, and wherein said control-and-evaluation unit is configured to detect, based on a detected position of said position-detection element, an actual position of said label-transfer element relative to said peripheral surface of said container in a three-dimensional detection space, wherein said sensor unit comprises an end position/zero position sensor that is configured to be triggered by movement of said label-transfer element along a pre-defined direction past a trigger point.

3. An apparatus comprising a bottle-labeling machine for applying a label to a peripheral surface of a container that is arranged for movement in a transport plane and about an axis of rotation, wherein said bottle labeling machine comprises a labeling machine, wherein said labeling machine comprises a label-transfer element, a sensor system, a position-detection element, and a control-and-evaluation unit, wherein said sensor system comprises a sensor unit, wherein said sensor unit is directed toward said label-transfer element, wherein said sensor unit is directed toward said position-detection element, wherein said position-detection element is detectable by said sensor unit, wherein said position-detection element is disposed on said label-transfer element, wherein said control-and-evaluation unit is operatively connected to said sensor unit, and wherein said control-and-evaluation unit is configured to detect, based on a detected position of said position-detection element, an actual position of said label-transfer element relative to said peripheral surface of said container in a three-dimensional detection space, wherein first sensor unit comprises an electro-optical sensor, downstream electronic image processing, and a laser pointer fixedly connected to said labeling machine, and wherein said laser pointer is aimed at a target on said label-transfer element.

4. The apparatus of claim 3, wherein said position-detection element is directly connected to said label-transfer element.

5. The apparatus of claim 3, wherein said sensor unit is configured for contact-free detection of a position of said position-detection element.

6. The apparatus of claim 3, wherein said control-and-evaluation unit is configured to compare a detected reference pattern with a stored pattern, and wherein said control-and-evaluation unit is further configured to determine an actual position of said label-transfer element based at least in part on said comparison.

7. The apparatus of claim 3, wherein said first sensor unit comprises an electronic inclination sensor that is disposed to detect an inclination of said label-transfer element relative to an axis thereof.

8. The apparatus of claim 3, wherein said label-transfer element is a self-adhesive labeling element, and wherein said self-adhesive labeling element comprises a dispensing edge.

9. The apparatus of claim 3, wherein said label-transfer element comprises a hot-glue labeling element, and wherein said hot-glue labeling element comprises a vacuum drum.

10. The apparatus of claim 3, wherein said label-transfer element comprises a cold-glue labeling element, wherein said cold-glue labeling element comprises a control system and a gripper cylinder.

11. The apparatus of claim 3, further comprising a rotary plate apparatus to arrange said container to be labeled in such a way as to be able to rotate about a longitudinal axis of said container.

12. The apparatus of claim 3, wherein said position-detection element comprises a body having a body edge.

13. An apparatus comprising a bottle-labeling machine for applying a label to a peripheral surface of a container that is arranged for movement in a transport plane and about an axis of rotation, wherein said bottle labeling machine comprises a labeling machine, wherein said labeling machine comprises a label-transfer element, a sensor system, a position-detection element, and a control-and-evaluation unit, wherein said sensor system comprises a sensor unit, wherein said sensor unit is directed toward said label-transfer element, wherein said sensor unit is directed toward said position-detection element, wherein said position-detection element is detectable by said sensor unit, wherein said position-detection element is disposed on said label-transfer element, wherein said control-and-evaluation unit is operatively connected to said sensor unit, and wherein said control-and-evaluation unit is configured to detect, based on a detected position of said position-detection element, an actual position of said label-transfer element relative to said peripheral surface of said container in a three-dimensional detection space, wherein said position-detection element comprises a body having a reference pattern surface.

14. An apparatus comprising a bottle-labeling machine for applying a label to a peripheral surface of a container that is arranged for movement in a transport plane and about an axis of rotation, wherein said bottle labeling machine comprises a labeling machine, wherein said labeling machine comprises a label-transfer element, a sensor system, a position-detection element, and a control-and-evaluation unit, wherein said sensor system comprises a sensor unit, wherein said sensor unit is directed toward said label-transfer element, wherein said sensor unit is directed toward said position-detection element, wherein said position-detection element is detectable by said sensor unit, wherein said position-detection element is disposed on said label-transfer element, wherein said control-and-evaluation unit is operatively connected to said sensor unit, and wherein said control-and-evaluation unit is configured to detect, based on a detected position of said position-detection element, an actual position of said label-transfer element relative to said peripheral surface of said container in a three-dimensional detection space, wherein said position-detection element comprises a body that, when illuminated by light of plural colors, absorbs all but one color, whereby said body is a colored body that is characterized by said color.

15. The apparatus of claim 3, wherein said position-detection element comprises a pyramidal body.

16. The apparatus of claim 3, further comprising a display unit for displaying said detected actual position.

17. The apparatus of claim 16, wherein said display unit is further configured to show a result of manual adjustment of said label-transfer element, and wherein said display unit is further configured to indicate that said labeling machine is ready of operation upon coincidence of an actual position of said label-transfer element and a target position thereof.

18. The apparatus of claim 3, wherein said first position-detection element is disposed at an invariable distance from a label-transfer point.

19. An apparatus comprising a bottle-labeling machine for applying a label to a peripheral surface of a container that is arranged for movement in a transport plane and about an axis of rotation, wherein said bottle labeling machine comprises a labeling machine, wherein said labeling machine comprises a label-transfer element, a sensor system, a first position-detection element, and a control-and-evaluation unit, wherein said sensor system comprises a first sensor unit, wherein said first sensor unit is directed toward said label-transfer element, wherein said first sensor unit is directed toward said first position-detection element, wherein said first position-detection element is detectable by said sensor unit, wherein said first position-detection element is disposed on said label-transfer element, wherein said control-and-evaluation unit is operatively connected to said first sensor unit, and wherein said control-and-evaluation unit is configured to detect, based on a detected position of said first position-detection element, an actual position of said label-transfer element relative to said peripheral surface of said container in a three-dimensional detection space, further comprising a second position-detection element, wherein said sensor system further comprises a second sensor unit, wherein said second sensor unit is directed toward said second position-detection element, and wherein said second sensor unit is operatively coupled to said control-and-evaluation unit.

20. The apparatus of claim 19, wherein said second position-detection element is directly connected to said label-transfer element, and wherein said first position-detection element is directly connected to said label-transfer element.

21. The apparatus of claim 3, wherein said sensor unit comprises a camera system.

* * * * *